United States Patent [19]
Walsh et al.

[11] Patent Number: 6,019,136
[45] Date of Patent: Feb. 1, 2000

[54] CONDUIT REPAIR SYSTEM

[75] Inventors: John Walsh, Largo; Scott Hedeen, St. Petersburg, both of Fla.

[73] Assignee: Fiberglass Coatings, Inc., St. Petersburg, Fla.

[21] Appl. No.: 08/985,023

[22] Filed: Dec. 4, 1997

[51] Int. Cl.[7] ............................................. F16L 55/162
[52] U.S. Cl. ........................ 138/98; 138/97; 138/168; 264/269
[58] Field of Search ............................ 138/97, 98, 168; 264/269, 36.16

[56] References Cited

U.S. PATENT DOCUMENTS

| | | | |
|---|---|---|---|
| 3,202,562 | 8/1965 | Lang et al. | 156/294 |
| 3,261,374 | 7/1966 | Anderson et al. | 138/97 |
| 4,776,370 | 10/1988 | Long, Jr. | 138/98 |
| 4,791,236 | 12/1988 | Klein et al. | 138/168 |
| 4,880,035 | 11/1989 | Vetter | 138/99 |
| 4,950,446 | 8/1990 | Kinumoto et al. | 214/516 |
| 4,985,196 | 1/1991 | Ledoux | 264/516 |
| 4,995,761 | 2/1991 | Barton | 405/154 |
| 5,027,862 | 7/1991 | Laybourn | 138/97 |
| 5,035,539 | 7/1991 | Kawafuji et al. | 405/154 |
| 5,049,003 | 9/1991 | Barton | 405/154 |
| 5,091,137 | 2/1992 | Ledoux | 264/516 |
| 5,199,463 | 4/1993 | Lippiatt | 138/98 |
| 5,203,377 | 4/1993 | Harrington | 138/97 |
| 5,213,727 | 5/1993 | Gargiulo | 264/40.3 |
| 5,228,477 | 7/1993 | Chirdon et al. | 138/97 |
| 5,265,648 | 11/1993 | Lyon | 138/98 |
| 5,322,653 | 6/1994 | Muller | 264/35 |
| 5,346,658 | 9/1994 | Gargiulo | 264/40.3 |
| 5,423,630 | 6/1995 | Imoto et al. | 138/97 |
| 5,501,248 | 3/1996 | Kiest Jr. | 138/98 |
| 5,628,345 | 5/1997 | Fisco | 138/98 |
| 5,727,597 | 3/1998 | Fisco | 138/98 |
| 5,765,597 | 6/1998 | Kiest, Jr. et al. | 138/97 |
| 5,869,159 | 2/1999 | Padilla | 138/168 |

*Primary Examiner*—James F. Hook
*Attorney, Agent, or Firm*—Dennis G. LaPointe; Mason & Associates, P.A.

[57] ABSTRACT

A conduit repair system and method are disclosed for repairing ruptures in underground conduits. One embodiment of the system comprises a repair liner including fusible link twine segments and hook and loop fasteners to allow the tautly wrapping of the repair liner around the inflatable bladder of a carrier and to secure the repair liner in place by attaching fusible link twine segments to the leading and trailing edges of a carrier. Another embodiment of the system includes a hook and loop fastener to directly engage the repair liner to the bladder, in combination with a water base releasing agent coated on the bladder, with or without the use of the fusible link twine segments. The methods disclosed as contemplated by the present invention utilizes the above-described conduit repair systems in combination with an inflatable bladder carrier, a water base releasing agent coated on the bladder or a releasing material such as a plastic sleeve or sheeting attached to the carrier and wrapped between the repair liner and bladder or a combination of a water base releasing agent and a releasing material, a thermosetting resin impregnating the repair liner, and the process of the resin impregnated repair liner cocuring and bonding to the conduit inner wall surface. The fusible link segments melt during the exothermic reaction, thereby disconnecting the repair liner from the carrier.

49 Claims, 5 Drawing Sheets

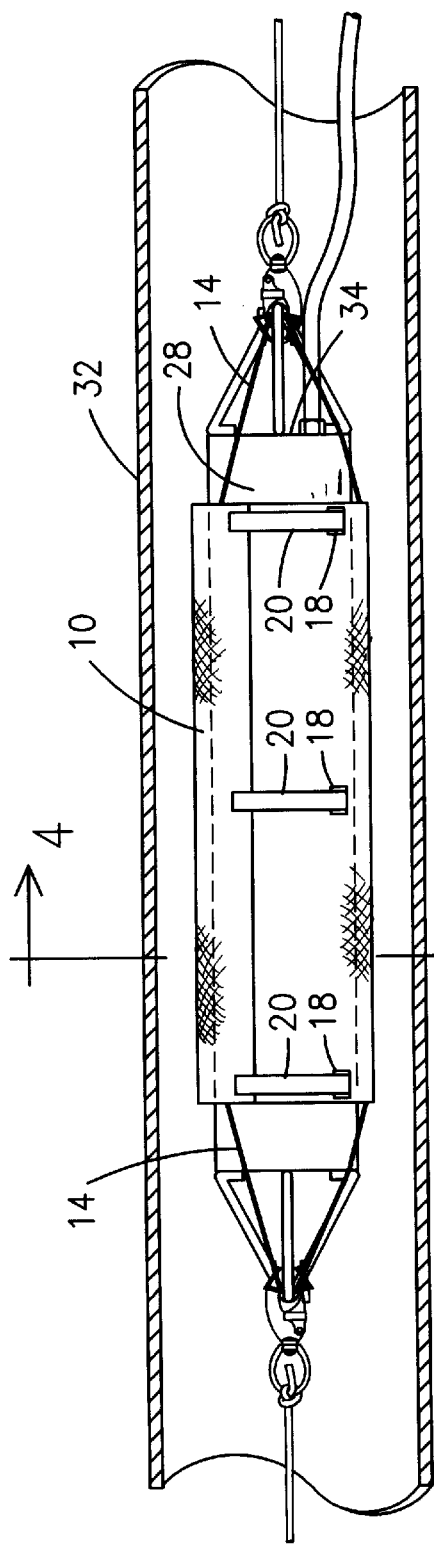
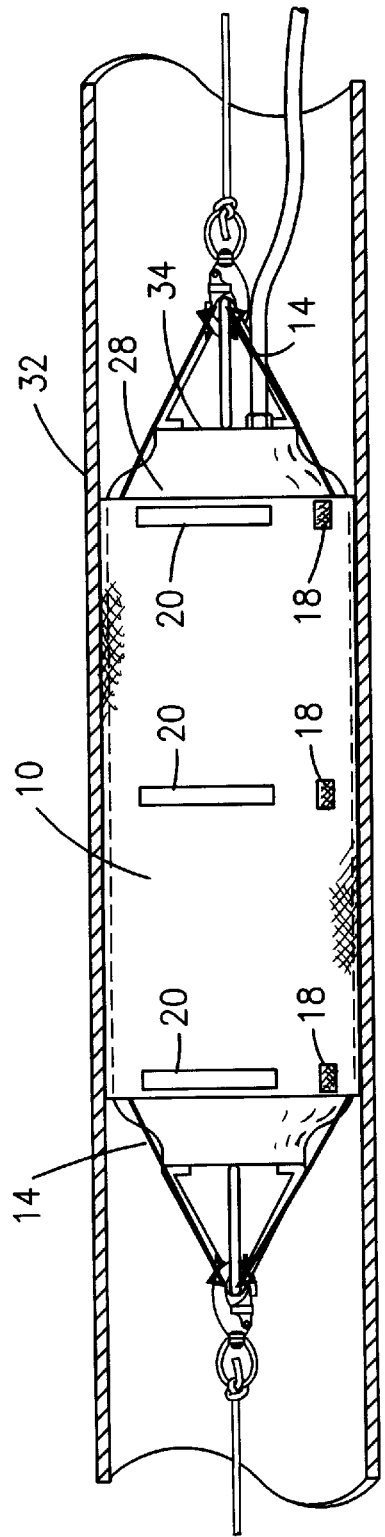

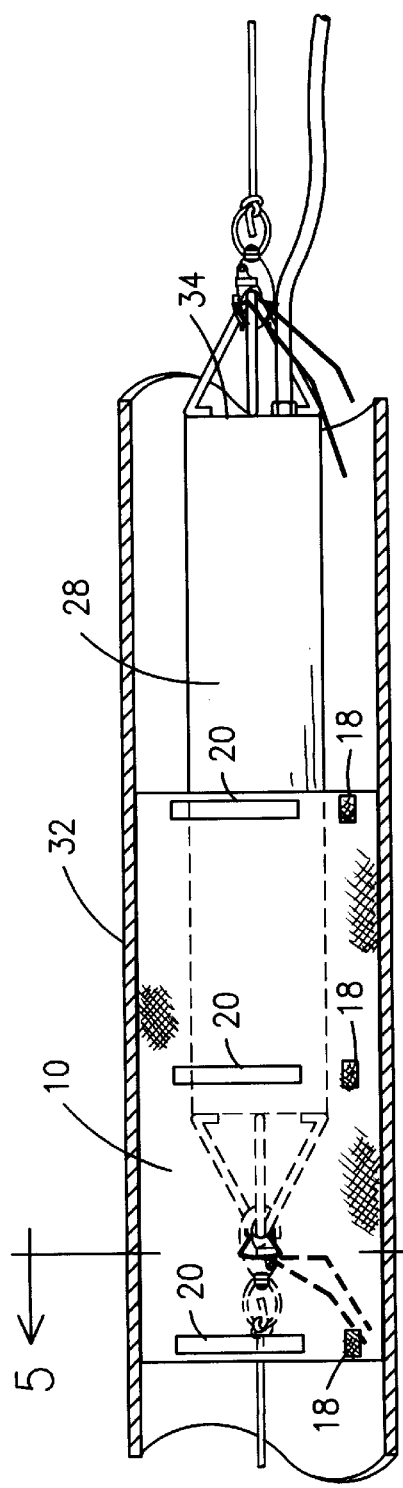
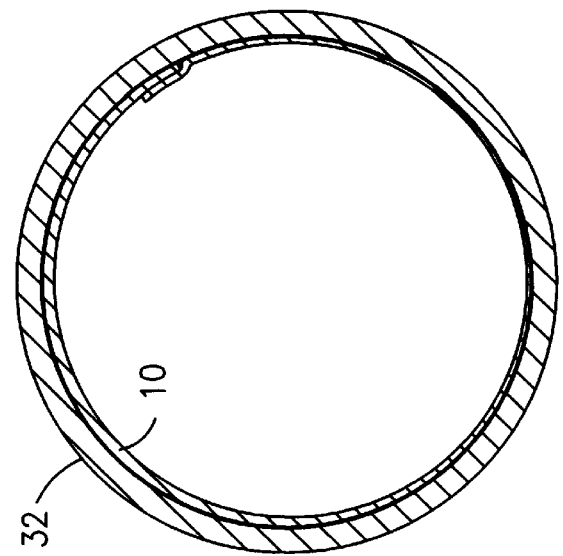
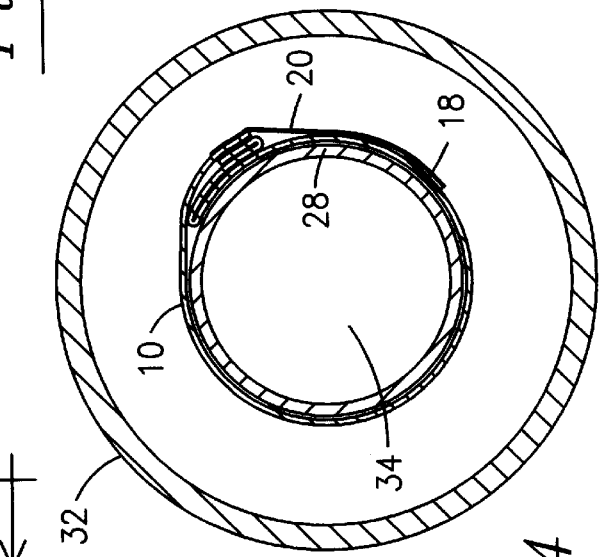

CONDUIT REPAIR SYSTEM

BACKGROUND OF THE INVENTION

1. Field of the invention

The invention relates to an improved system and method for rehabilitation of a sectionalized portion of a structurally damaged or leaking gravity flow system, service line, joint, crown failure and the bridging of offset pipe joints by the installation of a cured-in-place thermosetting resin impregnated structural liner.

2. Description of related art

Ruptures, cracks and holes often occur in underground conduits such as sanitary sewer lines, storm sewer pipes, and other gravity flow systems and service lines. Repairing these ruptured conduits, from within, is far less expensive and less dangerous than excavating and replacing the damaged sections. One such repair method is to introduce into the conduit a polyester-fiberglass or other structural composite liner impregnated with a thermosetting resin. The liner is wrapped around and secured to an inflatable bladder carrier which is positioned at the rupture and inflated, forcing the repair liner against the inside wall of the conduit. The impregnated composite liner adheres to the damaged inner surface of the conduit and hardens. After completion of the curing process, the bladder is deflated and removed from the conduit. Known related art include U.S. Pat. Nos. 4,995,761 and 5,049,003 to Barton, U.S. Pat. No. 5,628,345 to Fisco, U.S. Pat. No. 5,322,653 to Muller, U.S. Pat. No. 3,202,562 to Lang, et al., U.S. Pat. No. 3,261,374 to Anderson, et al., U.S. Pat. No. 4,776,370 to Long, U.S. Pat. No. 4,880,035 to Vetter, U.S. Pat. No. 4,950,446 to Kinumoto, et al., U.S. Pat. Nos. 4,985,196 and 5,091,137 to LeDoux, et al., U.S. Pat. No. 5,199,463 to Lippiatt, U.S. Pat. No. 5,203,377 to Harrington, U.S. Pat. Nos. 5,213,727 and 5,346,658 to Gargiulo, U.S. Pat. No. 5,265,648 to Lyon, and U.S. Pat. No. 5,501,248 to Kiest, et al.

A major recurring problem not remedied by known related art occurs when the resin impregnated liner slides, twists, buckles up or otherwise moves with respect to the inflated bladder carrier while being pulled through the conduit to the section of the conduit to be repaired. The liner might typically encounter a protruding pipe or other foreign object and get caught on the object. The liner will either slide partly or fully off the carrier, tear, or will fold back upon itself. Sometimes friction with a course surfaced conduit is enough to cause slippage. Consequently, when the carrier appears to be in the correct position the liner may not be in the proper position. If the problem is left undetected and the liner is not removed prior to inflating the bladder carrier, the cured repair liner may miss the damaged area. Further, the damaged area may be so close to the outside edge of the repair liner that the integrity of the repair is questionable. In addition, the repair liner may cure and harden in a distorted configuration within the conduit thus necessitating the need to remove the defectively installed repair liner, a costly and difficult process. The major problem can be traced back to improper or inadequate attachment of the repair liner to the bladder carrier, and the concomitant difficulty in releasing the repair liner from the bladder carrier. Previous prior related art methods and devices have not been able to overcome this problem.

Previous related art methods of holding the repair liner in place focus on holding the leading edge of the repair liner in place during movement within the conduit to the repair location; wrapping a break-away string around the repair liner, the break-away string breaking upon inflation of the bladder; or using rollers to separate the repair liner from the internal wall surface of the conduit. These methods do not remedy the problems encountered as described above, as the repair liner can nevertheless become distorted or move either during movement of the carrier or during the bladder inflation process or the break-away string may prematurely break during the movement of the carrier within the conduit.

Another problem encountered in the prior related art concerns the composite structural repair liner construction. Prior related art utilizes repair liners constructed with fiber-reinforced material such as a fiberglass mat attached to a polyester, foam, or felt mat. The capacity of such dual layered repair liners to absorb and hold sufficient amounts of thermosetting resin, thus ensuring a uniform bond with the internal surface of the conduit being repaired and ensuring a smooth internal finish after cocuring and removal of the carrier, is limited.

SUMMARY OF THE INVENTION

The present invention is an improved repair system and method of holding a composite structural repair liner uniformly in place on an inflatable bladder carrier.

One embodiment utilizes two or more fusible link twine segments attached to a first end of the repair liner and two or more fusible link twine segments attached to a second end of the repair liner, said ends being the leading and trailing ends respectively of the repair liner. The repair liner is wrapped around the carrier and its opposite sides are mated longitudinally along the length of the carrier with a hook and loop fastener strip; the repair liner is then tautly wrapped around the inflatable bladder carrier and two or more approximately evenly spaced apart hook and loop fasteners are wrapped circumferentially around the tautly wrapped repair liner. The fusible link twine is then secured to each end of the carrier. This embodiment is used in combination with a water base releasing agent coated on the inflatable bladder or with a releasing material in the form of a plastic sleeve or sheeting attached to the carrier at one end and layered between the repair liner and the carrier. The releasing material is typically polyethylene or similar material. A further embodiment of the present invention utilizes the water base releasing agent in combination with a releasing material such as a polyethylene sleeve or sheeting.

Another embodiment utilizes the features of the above described embodiment without the use of the fusible link twine but with the addition of a hook and loop fastener strip, one portion longitudinally fixed along the inflatable bladder and its mating portion longitudinally fixed to the repair liner, to hold said repair liner in place against the surface of the inflatable bladder carrier. In this embodiment, a water base releasing agent is coated on the inflatable bladder, including the attached portion of the hook and loop fastener strip so that when the bladder is deflated, the repair liner will completely separate from the bladder surface.

A further embodiment includes the use of fusible link twine as described in the former embodiment in combination with the features of the latter embodiment's hook and loop fastener longitudinally fixed along the carrier surface. A water base releasing agent is coated on the carrier surface and between the hook and loop fastener mating surfaces to ensure release of the carrier from the repair liner.

The composite structural repair liner is generally a composite structure of layered mats comprising a layer of fiber-reinforced material such as fiberglass and a layer of polyester, felt, foam or similar materials. The preferred embodiment layers the fiber-reinforced material between the two layers of polyester, felt foam or similar materials or between combinations of such polyester, felt, foam or similar materials. Although fiber-reinforced material such as 0/60, 0/90, +45/−45 or combination thereof with nominal weights ranging from about 12 oz./yd$^2$ to about 96 oz./yd$^2$ may be utilized, the preferred embodiment utilizes a 0/90 fiber-reinforced material with a nominal weight of about 32 oz./yd . The composite structural repair liner is compatible thermosetting resins and is capable of accepting sufficient volume to compensate for any migration of the resin into defects in the pipe to effectively prevent intrusion of water and soil, while retaining its integrity.

The thermosetting resin is a two component thermosetting polyester, vinylester, or epoxy resin. The thermosetting resin is mixed with other chemicals to insure complete wet out of the repair liner, and assuring that the liner will achieve superior bond strength to the substrate under both dry and wet conditions as well as warm and cold climates.

The carrier is typically an inflatable bladder carrier of differing designs available from several manufacturers. A preferred carrier, if the situation allows, incorporates a flow-through means within the carrier to allow uninterrupted service, while the bladder is inflated and the resin impregnated composite liner cocures forming a bond with the internal circumference of the host pipe.

The improved repair system features hook and loop fasteners attached to the composite repair liner. The two opposite edges of the composite repair liner are joined longitudinally along the carrier with a hook and loop fastener prior to tautly wrapping the repair liner around the inflatable bladder carrier. A minimum of two hook and loop fasteners, one on each end of the composite repair liner, with additional hook and loop fasteners approximately evenly spaced, typically about one foot apart, between the leading and trailing edges of the composite repair liner, are utilized as means to secure a tautly wrapped composite repair liner to the inflatable bladder. The hook and loop fasteners sufficiently prevent the composite repair liner from unwrapping while being transported by the carrier system within the conduit, yet release upon inflation of the bladder to allow the composite repair liner to form and bond to the internal circumference of the conduit.

Another feature of the improved conduit repair system is the incorporation of a plurality of fusible links. The fusible link twine is a thermoplastic resinous fiber filament of polyolefin elastomers such as polyethylene, polypropylene and polybutene, or combinations thereof, which has a low melting point. One end of the fusible link is secured to the composite repair liner with a bonding agent. The fusible links can be secured to either side of the composite repair liner. Fusible links are attached at the leading and trailing edges of the composite repair liner and serve as a means to secure such edges of the composite repair liner to the opposite ends of the carrier, thus preventing movement of the tautly wrapped composite repair liner as the carrier is moved within the conduit to the damaged pipe location. The fusible link is strong at ambient temperatures and will securely hold the composite repair liner in place on the carrier during insertion into the conduit, positioning at the rupture site, and inflation of the inflatable bladder.

During the resin curing process, heat generated by the exothermic reaction will cause the fusible link material to melt, thus completely disconnecting the composite repair liner from the carrier ends.

The improved conduit repair system featuring the fusible link is wrapped around the bladder portion of a carrier with a releasing material, typically a plastic sleeve or sheeting wrapped between the carrier and the resin impregnated composite repair liner. The releasing material is secured at the leading edge of the carrier's inflatable bladder and is removed from the conduit in conjunction with the carrier removal.

Another feature of the improved conduit repair system and method of repair is the use of a releasing agent coated on the bladder surface instead of the releasing material, prior to wrapping the resin impregnated composite repair liner around the bladder, thus enabling the inflatable bladder to easily separate from the resin impregnated composite repair liner after completion of the curing process and deflation of the bladder. Another feature of the improved conduit repair system and method of repair is the use of a water base releasing agent coated on the bladder surface in combination with the releasing material, prior to wrapping the resin impregnated composite repair liner around the bladder.

Instead of using fusible links to secure the leading and trailing edges of the composite repair liner to the carrier, a further feature of the improved conduit repair system and method of conduit repair is the use of a hook and loop fastener strip longitudinally fixed along the inflatable bladder and repair liner, thus temporarily securing the composite repair liner uniformly along the bladder surface. The use of the hook and loop fastener strip is used in combination with a releasing agent coated on the bladder surface and a mating portion of the hook and loop fastener strip. The opposite mating portion of the hook and loop fastener strip, attached to the composite repair liner, is joined with the strip on the bladder. The composite repair liner is then wrapped around the bladder, joined with a hook and loop fastener at its ends and tautly wrapped around the bladder, securing the composite repair liner in place with the hook and loop fastener straps approximately evenly spaced apart along the composite repair liner.

The above-described improved conduit repair system and method of conduit repair featuring the fusible links may be used in combination with the above-described feature utilizing the hook and loop fastener longitudinally attached to the carrier in combination with the releasing agent coated on the inflatable bladder and the mating portion of the longitudinally placed hook and loop fastener.

The above-described embodiments prevent slippage and movement of the resin impregnated repair liner and yield a quality cured in place liner.

BRIEF DESCRIPTION OF THE DRAWINGS

For a fuller understanding of the nature and objects of the invention, reference should be made to the following detailed description, taken in connection with the accompanying drawings, in which:

FIG. 1 is a side elevational cross-sectional view of a conduit repair system tautly wrapped around a carrier shown in its deflated position inside a conduit, said repair system leading and trailing edges being secured with fusible link twine to the carrier ends.

FIG. 2 is a side elevational cross-sectional view of the conduit repair system adhering to the conduit internal wall surface after inflation of the carrier bladder.

FIG. 3 is a side elevational cross-sectional view of the conduit repair system cocured in place with the fusible links having melted thus separating the conduit repair system from the carrier and said carrier shown in the process of being removed from the conduit.

FIG. 4 is a cross-sectional view of the carrier and conduit repair system of FIG. 1 within a conduit, taken along line 4—4 of FIG. 1, showing the conduit repair system being tautly wrapped around the bladder of the carrier and secured with hook and loop fasteners.

FIG. 5 is a cross-sectional view of the conduit repair system of FIG. 1 taken along line 5—5 of FIG. 3, showing the conduit repair system cocured to the internal wall surface of the conduit after removal of the carrier from the conduit.

DETAILED DESCRIPTION OF THE INVENTION

Figure 6:
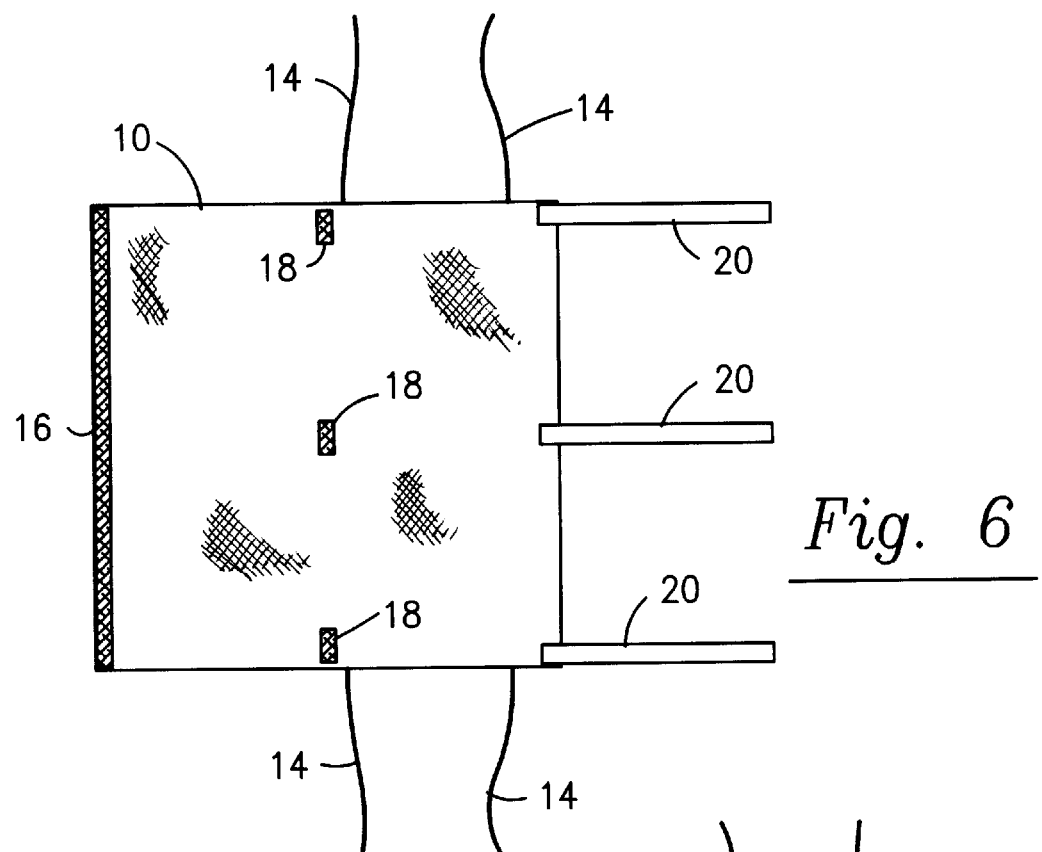
FIG. 6 is a bottom view of the conduit repair system depicting the use of fusible link twine at the leading and trailing edges of the repair liner and hook and loop fasteners longitudinally fixed along one edge of the repair liner as well as intermittently spaced longitudinally at the approximate center of the repair liner, in combination with a plurality of hook and loop fastener straps fixed to the side of the repair liner opposite the side with the longitudinal hook and loop fastener.
Figure 7:
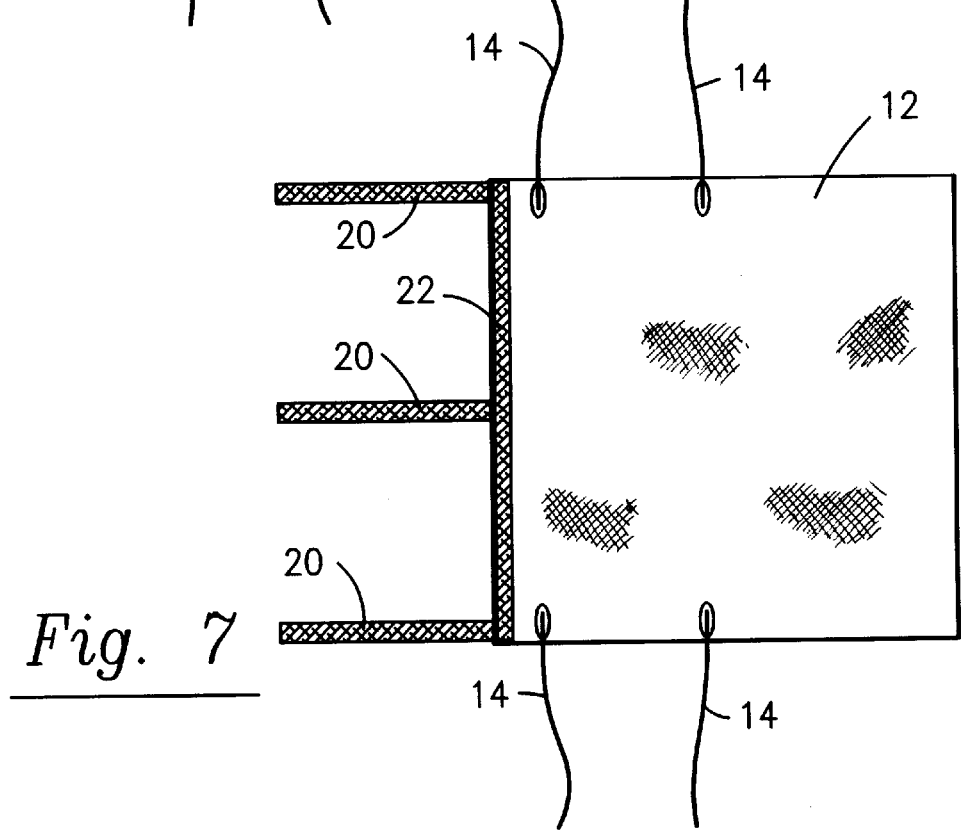
FIG. 7 is a top view of the conduit repair system of FIG. 6 depicting the fusible link twine segments fixed to the repair liner and further showing a loop side portion of hook and loop fastener longitudinally fixed along the same edge of the repair liner with the hook and loop fastener straps of FIG. 6.

Referring now to the drawings, FIGS. 6 and 7 show a conduit repair system 10 comprising a composite structural repair liner 12, said repair liner having a plurality, minimum two, segments of fusible link twine 14, said fusible link twine 14 being attached at one end to the repair liner 12 leading edge and similarly said repair liner having a plurality, minimum two, segments of fusible link twine 14 attached at one end to the repair liner 12 trailing edge, as shown in FIG. 7.

System 10 further utilizes hook and loop fasteners 16, 18, 20, and 22, similar to VELCRO-type material. As shown in FIG. 6, repair liner 12 has attached to it a longitudinal hook and loop fastener portion 16, said hook and loop fastener portion 16 being attached along one edge of the repair liner 12 extending between said repair liner's leading and trailing edges. The mating hook and loop fastener portion 22 of said hook and loop fastener portion 16 is attached on the opposite side of said repair liner 12 at the opposing end, means for engaging repair liner 12 circumferentially around a carrier as shown in FIGS. 2–5. FIG. 6 further depicts a plurality of hook and loop fastener straps 20, said straps 20 being attached to the repair liner 12 perpendicular to the longitudinal edge extending between the leading and trailing edges of said repair liner 12, and said straps 20 approximately evenly spaced, typically about one foot apart, between the leading and trailing edges of the repair liner 12. FIG. 6 further shows a plurality of hook and loop fastener segments, typically about one inch by two inches, said segments being intermittently attached to the repair liner 12 at its approximate center and aligned to engage said straps 20, means for eventually tautly wrapping said repair liner around a carrier 34 as shown in FIG. 1.

Figures 8, 9:
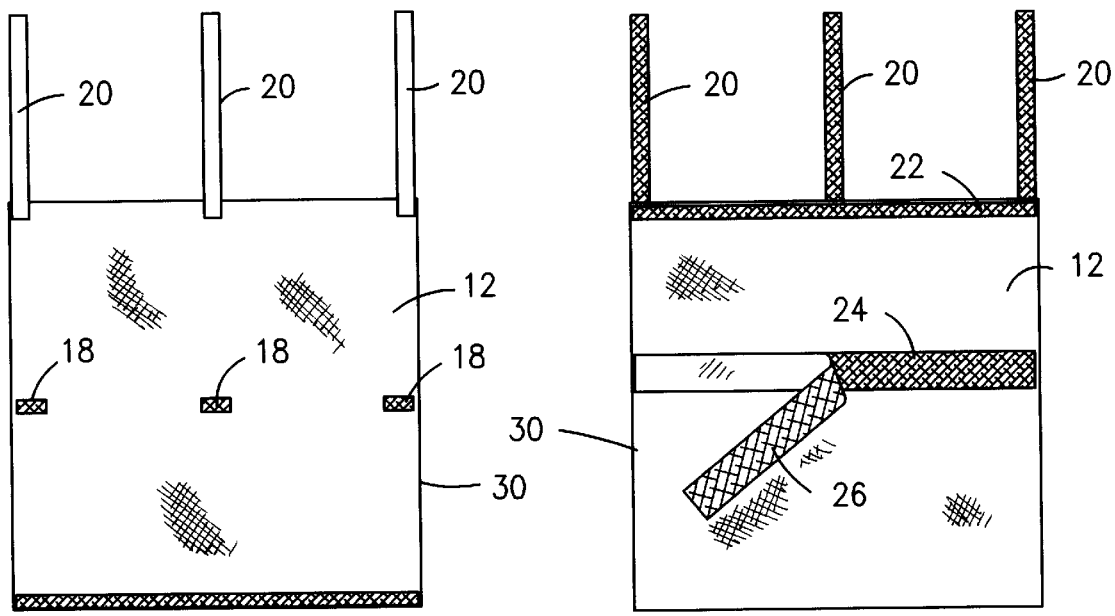
FIG. 8 is a top view of the conduit repair system of FIG. 6 without the use of fusible link twine.
FIG. 9 is a bottom view of the conduit repair system of FIG. 8 depicting a longitudinally attached hook and loop fastener fixed to the repair liner, the mating portion of said hook and loop fastener being removed for later securing along the bladder of carrier.
Figure 10:
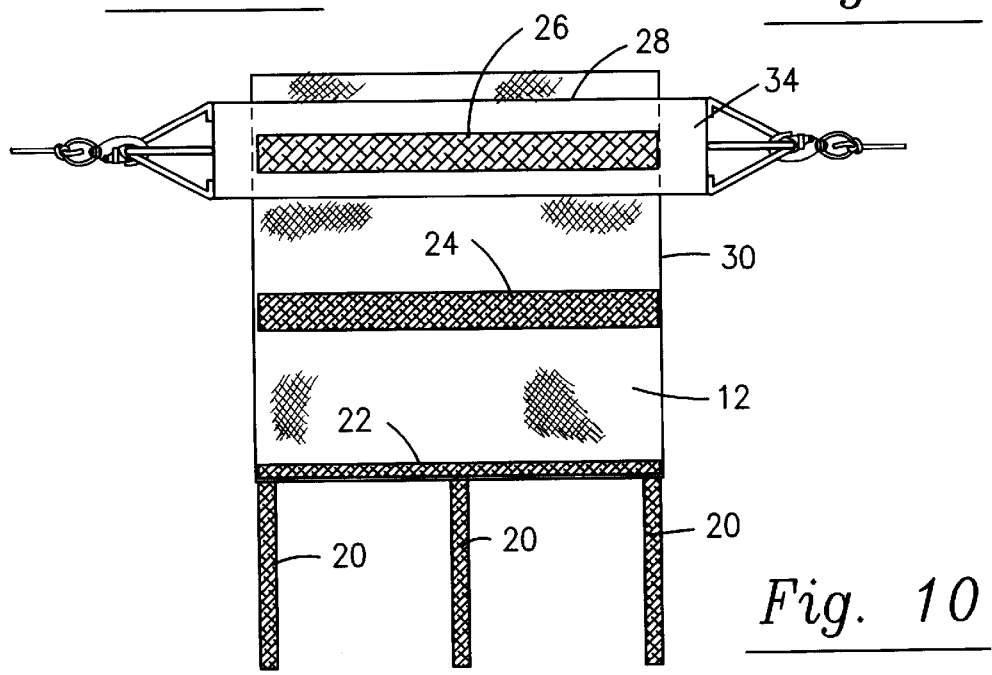
FIG. 10 is a perspective view of the embodiment of the present invention as depicted in FIG. 8 and FIG. 9 where the mating portion of the hook and loop fastener is secured to the bladder of the carrier and the carrier is then placed on the conduit repair system for eventual wrapping of the repair system around the bladder of the carrier.

Another embodiment of the conduit repair system is depicted in FIGS. 8–10. FIG. 8 shows the embodiment of FIG. 6 without the attached fusible link twine 14. In this embodiment, the conduit repair system 30 further comprises a hook and loop fastener portion 24, said hook and loop fastener portion 24 being longitudinally fixed to said repair liner 12 at its approximate center and extending between said repair liner's leading and trailing edges. As shown in FIG. 10, hook and loop fastener portion 26, means for eventually engaging hook and loop fastener portion 24, is fixed longitudinally on carrier bladder 28.

A further embodiment of the conduit repair system not depicted in a individual drawing is a combination of the embodiment depicted in FIGS. 6–7 and FIGS. 8–10, that is, the embodiment of FIGS. 8–10, with the addition of the fusible link twine 14 depicted in FIGS. 6–7.

Figure 11:
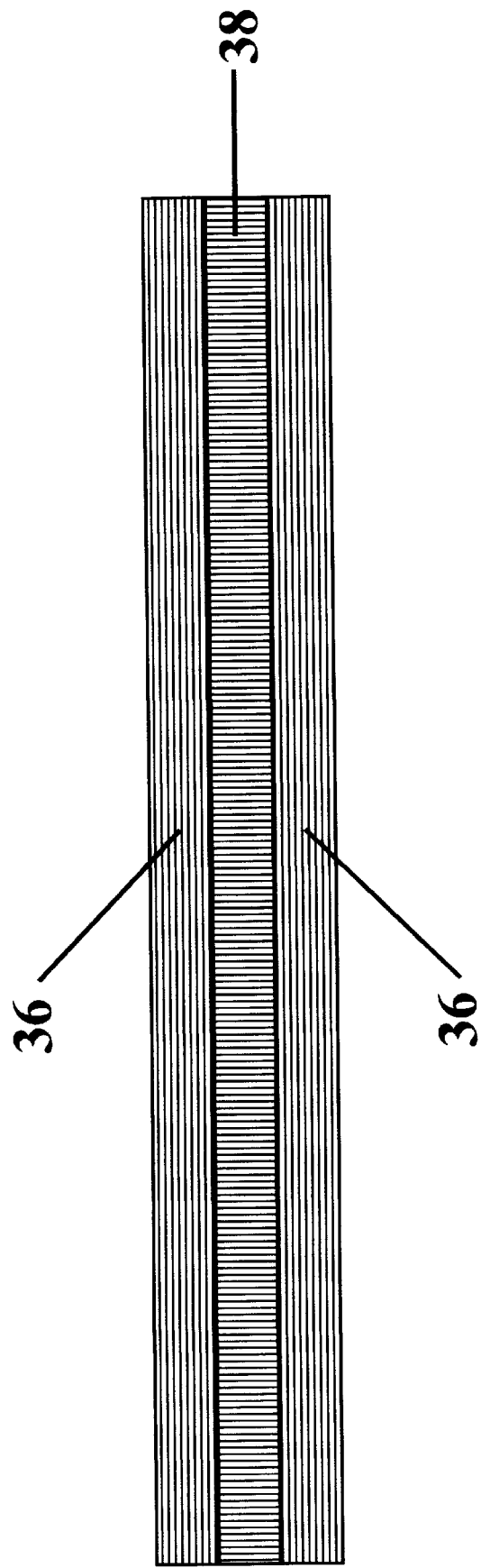
FIG. 11 is a cross-sectional view of the embodiment of the repair liner depicting a fiber-reinforced material layered between layers of polyester, foam, felt or similar materials, or combinations of such materials.

FIG. 11 depicts a cross-sectional view of the preferred embodiment of the repair liner of FIGS. 6–9, in particular, the embodiment featuring the fiber-reinforced material 38 layered between mats 36 constructed of polyester, foam, felt or similar materials, or combinations thereof.

FIGS. 1–4 show a method for repairing conduit 32 utilizing the above-described conduit repair systems. Carrier 34 is a carrier that could be of differing designs comprising an inflatable bladder portion and means for inflating and deflating said bladder portion. A releasing material, not shown, is attached to the carrier at one end, said releasing material is generally a plastic sleeve or sheeting material of sufficient length to cover the bladder portion of the carrier and extend beyond the leading and trailing edges of the repair liner. Conduit repair system 10 is then thoroughly coated on both sides with a resin formulation, generally a two component thermosetting polyester, vinylester or epoxy resin, containing chemicals to insure complete wet out of the repair liner. The conduit repair system 10 is then wrapped around the releasing material and bladder portion 28 of the carrier 34, and the repair liner portion 12 is joined together by hook and loop fastener mating portions 16 and 22. As shown in FIG. 4, the repair liner 12 is tautly wrapped around the bladder 28 and secured in said tautly wrapped configuration by engaging hook and loop fastener portions 18 and 20 respectively. Any excess strap 20 length extending beyond its respective mating hook and loop fastener portion 18 is cut off.

Fusible link twine 14 is then attached at the respective leading and trailing ends of the carrier 34. The carrier with the conduit repair system is then transported to the repair site within a conduit by various means such as cabling and winching from manhole to manhole. The carrier is positioned in the area to be repaired and the bladder 28 is pressurized to a constant pressure sufficient to insure uniform bonding of the repair liner 12 to the host conduit during the curing period. The constant pressure is typically in the 5–10 psi range. The impregnated composite repair liner 12 thus cocures forming a bond with the internal circumference of the host conduit 32. The fusible link twine 14, which is a thermoplastic resinous fiber filament of polyolefin elastomers such as polyethylene, polypropylene and polybutene, or combinations thereof and which has a low melting point melts from the heat generated by the exothermic reaction, so that when the resin is cured, the repair liner 12 will be disconnected from the carrier 34 as shown in FIG. 3. 14 FIG. 1 shows the combination conduit repair system 10 within a conduit 32. FIG. 2 shows the system 10 with the bladder 28 inflated and the repair liner 12 expanded to bond to the internal wall surface of the conduit. After completion of the bonding process, the bladder is deflated and the carrier, with its attached releasing material, is then removed from the conduit as shown in FIG. 3, the method of repair resulting in a conduit repair as depicted in FIG. 5.

An alternative embodiment of the above method of repairing conduit is the use of a water base releasing agent coated to the bladder 28 of the carrier instead of using releasing material as described above, or in combination with the above-described releasing material. The impregnation of the repair liner and the installation of the carrier with attached conduit repair liner in the conduit, inflation of the bladder, curing process, deflation of the bladder, and removal of the carrier is as described above.

Another alternative embodiment of the present invention is a method using conduit repair system 30, without fusible link twine, with a water base releasing agent coated on bladder 28 and on the hook and loop fastener portion 26 as depicted in FIG. 10. After impregnating the repair liner 12 as described above, hook and loop fastener portion 26 on bladder 28 is engaged with its mating hook and loop fastener portion 24 attached to repair liner 12. The repair liner is then wrapped around the bladder and joined by means of hook and loop fastener portions 16 and 22. The installation of the carrier with attached conduit repair system in the conduit, inflation of the bladder, curing process, deflation of the bladder, and removal of the carrier is as described above.

A further embodiment of the present invention is a method as described above using a water base releasing agent on the bladder 28 in combination with conduit repair system 30, further featuring the use of fusible link twine 14.

As seen from the foregoing description, the present invention satisfies the need to provide a means for attaching the repair liner to the carrier securely, so that the repair liner will not be displaced or distorted during positioning within the conduit.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. A conduit repair system comprising:
   a repair liner sufficiently large to cover a rupture in a conduit;
   a plurality of fusible link twine segments attached to a leading edge and a trailing edge of the repair liner, means for attaching the leading edge of the repair liner to a first carrier end and means for attaching the trailing edge of the repair liner to a second carrier end, the fusible link twine segments being capable of melting from an exothermic reaction of a thermosetting resin formulation so as to disconnect the repair liner from the carrier; and
   a plurality of hook and loop fasteners, means for uniformly engaging a first end and an opposite second end of the repair liner, the means extending from the leading edge to the trailing edge of the repair liner when the repair liner is wrapped around a bladder of the carrier, and means for tautly wrapping the repair liner around the bladder.

2. A conduit repair system according to claim 1, wherein the repair liner comprises:
   a first layer of material capable of absorbing a thermosetting resin formulation;
   a second layer of material capable of absorbing said thermosetting resin formulation; and
   a layer of fiber-reinforced material fixed between said first and second layers of material capable of absorbing the thermosetting resin formulation.

3. A conduit repair system according to claim 2, wherein the layer of fiber-reinforced material is constructed of 0/90 fiber-reinforced material, said fiber-reinforced material having a nominal weight of about 32 oz./yd$^2$.

4. A conduit repair system according to claim 2, wherein the first layer of material capable of absorbing said thermosetting resin formulation is constructed from materials selected from a group consisting of polyester, felt, foam and combinations thereof; and wherein the second layer of material capable of absorbing said thermosetting resin formulation is constructed from materials selected from a group consisting of polyester, felt, foam and combinations thereof.

5. A conduit repair system according to claim 1, wherein the fusible link twine segments are selected from a group of thermoplastic resinous fiber filaments of polyolefin elastomers consisting of polyethylene, polypropylene, polybutene, and combinations thereof.

6. A conduit repair system according to claim 1, wherein the plurality of hook and loop fasteners include:
   a hook and loop fastener longitudinally fixed along the first end of the repair liner, said first end extending between the leading and the trailing edges of the repair liner and a mating hook and loop fastener longitudinally fixed along the second end and on an opposite side of the repair liner, means for engaging the repair liner circumferentially around a bladder;
   a plurality of hook and loop fastener straps, said straps being attached to the repair liner perpendicular to the second end of the repair liner and a plurality of mating hook and loop fastener segments, said segments being attached to the repair liner at an intermediate position between the first and second ends of the repair liner and aligned to engage the plurality of hook and loop fastener straps.

7. A conduit repair system according to claim 6, wherein said hook and loop fasteners comprise hook and loop VELCRO-type material.

8. A conduit repair system according to claim 6, further comprising a release liner attached to a first end of the carrier and interposed between the repair liner and the bladder so as to prevent a resin from adhering to the bladder.

9. A conduit repair system according to claim 8, further comprising a water base release agent coated on the bladder surface.

10. A conduit repair system comprising:
a repair liner sufficiently large to cover a rupture in a conduit;
a plurality of fusible link twine segments attached to a leading edge and a trailing edge of the repair liner, means for attaching the leading edge of the repair liner to a first carrier end and means for attaching the trailing edge of the repair liner to a second carrier end, the fusible link twine segments being capable of melting from an exothermic reaction of a thermosetting resin formulation so as to disconnect the repair liner from the carrier; and
a plurality of hook and loop fasteners, means for uniformly engaging a first end and an opposite second end of the repair liner, the means extending from the leading edge to the trailing edge of the repair liner when the repair liner is wrapped around a bladder of the carrier, means for tautly wrapping the repair liner around the bladder, and means for attaching the repair liner at an intermediate position longitudinally extending between the leading and trailing edges of the repair liner directly to the bladder of the carrier.

11. A conduit repair system according to claim 10, wherein the repair liner comprises:
a first layer of material capable of absorbing a thermosetting resin formulation;
a second layer of material capable of absorbing said thermosetting resin formulation; and
a layer of fiber-reinforced material fixed between said first and second layers of material capable of absorbing the thermosetting resin formulation.

12. A conduit repair system according to claim 11, wherein the layer of fiber-reinforced material is constructed of 0/90 fiber-reinforced material, said fiber-reinforced material having a nominal weight of about 32 oz./yd$^2$.

13. A conduit repair system according to claim 11, wherein the first layer of material capable of absorbing said thermosetting resin formulation is constructed from materials selected from a group consisting of polyester, felt, foam and combinations thereof; and wherein the second layer of material capable of absorbing said thermosetting resin formulation is constructed from materials selected from a group consisting of polyester, felt, foam and combinations thereof.

14. A conduit repair system according to claim 10, wherein the fusible link twine segments are selected from a group of thermoplastic resinous fiber filaments of polyolefin elastomers consisting of polyethylene, polypropylene, polybutene, and combinations thereof.

15. A conduit repair system according to claim 10, wherein the plurality of hook and loop fasteners include:
a hook and loop fastener longitudinally fixed along the first end of the repair liner, said first end extending between the leading and the trailing edges of the repair liner and a mating hook and loop fastener longitudinally fixed along the second end and on an opposite side of the repair liner, means for engaging the repair liner circumferentially around a bladder;
a plurality of hook and loop fastener straps, said straps being attached to the repair liner perpendicular to the second end of the repair liner and a plurality of mating hook and loop fastener segments, said segments being attached to the repair liner at an intermediate position between the first and second ends of the repair liner and aligned to engage the plurality of hook and loop fastener straps; and
a hook and loop fastener longitudinally attached to the repair liner at an intermediate position and extending between the leading edge and the trailing edge of the repair liner, means for engaging a mating hook and loop fastener longitudinally attached to the bladder of the carrier.

16. A conduit repair system according to claim 15, further comprising a water base releasing agent coated on the bladder surface and the hook and loop fastener longitudinally attached to the bladder.

17. A conduit repair system according to claim 15, wherein said hook and loop fasteners comprise hook and loop VELCRO-type material.

18. A conduit repair system comprising:
a repair liner sufficiently large to cover a rupture in a conduit; and
a plurality of hook and loop fasteners, means for engaging a first end and an opposite second end of the repair liner when wrapped around a bladder of the carrier, means for tautly wrapping the repair liner around the bladder, and means for attaching the repair liner at an intermediate position longitudinally extending between the leading and trailing edges of the repair liner directly to the bladder of the carrier.

19. A conduit repair system according to claim 18, wherein the repair liner comprises:
a first layer of material capable of absorbing a thermosetting resin formulation;
a second layer of material capable of absorbing said thermosetting resin formulation; and
a layer of fiber-reinforced material fixed between said first and second layers of material capable of absorbing the thermosetting resin formulation.

20. A conduit repair system according to claim 19, wherein the layer of fiber-reinforced material is constructed of 0/90 fiber-reinforced material, said fiber-reinforced material having a nominal weight of about 32 oz./yd$^2$.

21. A conduit repair system according to claim 19, wherein the first layer of material capable of absorbing said thermosetting resin formulation is constructed from materials selected from a group consisting of polyester, felt, foam and combinations thereof; and wherein the second layer of material capable of absorbing said thermosetting resin formulation is constructed from materials selected from a group consisting of polyester, felt, foam and combinations thereof.

22. A conduit repair system according to claim 18, wherein the plurality of hook and loop fasteners include:
a hook and loop fastener longitudinally fixed along the first end of the repair liner, said first end extending between the leading and the trailing edges of the repair liner and a mating hook and loop fastener longitudinally fixed along the second end and on an opposite side of the repair liner, means for engaging the repair liner circumferentially around a bladder;
a plurality of hook and loop fastener straps, said straps being attached to the repair liner perpendicular to the second end of the repair liner and a plurality of mating hook and loop fastener segments, said segments being attached to the repair liner at an intermediate position between the first and second ends of the repair liner and aligned to engage the plurality of hook and loop fastener straps; and
a hook and loop fastener longitudinally attached to the repair liner at an intermediate position and extending between the leading edge and the trailing edge of the repair liner, means for engaging a mating hook and loop fastener longitudinally attached to the bladder of the carrier.

23. A conduit repair system according to claim 22, further comprising a water base releasing agent coated on the bladder surface and the hook and loop fastener longitudinally attached to the bladder.

24. A conduit repair system according to claim 22, wherein said hook and loop fasteners comprise hook and loop VELCRO-type material.

25. A method for repairing ruptures in a generally cylindrical underground conduit, comprising the steps of:
securely attaching a release liner at a first end of a carrier, said first end being a leading end of the carrier to be introduced in a conduit and said release liner being wrapped circumferentially around a bladder surface of the carrier;
applying a thermosetting resin formulation to a repair liner;
placing the carrier on the repair liner;
wrapping the repair liner around the bladder surface of the carrier and engaging a first end of the repair liner with a second end of the repair liner with a hook and loop fastener;
tautly wrapping the repair liner around the release liner superimposed on the bladder surface and circumferentially securing the tautly wrapped repair liner with a plurality of hook and loop fastener straps;
securing a leading edge of the repair liner to the leading end of the carrier with a plurality of fusible link twine segments attached to the repair liner at its leading edge;
securing a trailing edge of the repair liner to the trailing end of the carrier with a plurality of fusible link twine segments attached to the repair liner at its trailing edge;
introducing said carrier and repair liner combination into a cylindrical conduit, proximate said rupture to be repaired;
inflating said bladder so that the plurality of hook and loop fastener straps disengage and release the repair liner from its tautly wrapped configuration allowing generally conforming engagement of the repair liner with the inner circumferential surface of the conduit to be repaired; and
allowing said thermosetting resin formulation to cocure and bond said repair liner to the conduit and during said cocuring process, the fusible link segments melt from exothermic reaction of the thermosetting resin formulation so as to disconnect the repair liner from the carrier.

26. The method of claim further comprising the step of applying a water base releasing agent to the bladder surface.

27. The method of claim 26, further including deflating said bladder after the bonding substance has cocured to provide a repaired conduit.

28. The method of claim 27, further including removing said carrier with attached release liner from the conduit after deflating the bladder.

29. The method of claim 28, in which said repair liner is shorter than the length of the bladder surface.

30. A method according to claim 25, wherein said thermosetting resin formulation is a two part thermosetting resin formulation selected from a group consisting of polyester, vinylester, and epoxy resins.

31. A method according to claim 25, wherein the repair liner comprises:
a first layer of material capable of absorbing a thermosetting resin formulation;
a second layer of material capable of absorbing said thermosetting resin formulation; and
a layer of fiber-reinforced material fixed between said first and second layers of material capable of absorbing the thermosetting resin formulation.

32. A method according to claim 31, wherein the layer of fiber-reinforced material is constructed of 0/90 fiber-reinforced material, said fiber-reinforced material having a nominal weight of about 32 oz./yd$^2$.

33. A method according to claim 31, wherein the first layer of material capable of absorbing said thermosetting resin formulation is constructed from materials selected from a group consisting of polyester, felt, foam and combinations thereof; and wherein the second layer of material capable of absorbing said thermosetting resin formulation is constructed from materials selected from a group consisting of polyester, felt, foam and combinations thereof.

34. A method of repairing ruptures in a generally cylindrical underground conduit, comprising the steps of:
attaching a hook and loop fastener means to a bladder surface of a carrier, said hook and loop fastener extending longitudinally along the bladder surface and being of sufficient length to engage a mating hook and loop fastener attached to a repair liner;
applying a water base releasing agent to the bladder surface including the hook and loop fastener attached to the bladder surface;
applying a thermosetting resin formulation to a repair liner;
placing the carrier on the repair liner and engaging the hook and loop fastener attached to the bladder surface and its mating hook and loop fastener attached to the repair liner at an intermediate position and extending between a leading edge and a trailing edge of the repair liner;
wrapping the repair liner around the bladder surface of the carrier and engaging a first end of the repair liner with a second end of the repair liner with a hook and loop fastener;
tautly wrapping and circumferentially securing said tautly wrapped repair liner with a plurality of hook and loop fastener straps;
securing a leading edge of the repair liner to the leading end of the carrier with a plurality of fusible link twine segments attached to the repair liner at its leading edge;
securing a trailing edge of the repair liner to the trailing end of the carrier with a plurality of fusible link twine segments attached to the repair liner at its trailing edge;
introducing said carrier and repair liner combination into a cylindrical conduit, proximate said rupture to be repaired;
inflating said bladder so that the plurality of hook and loop fastener straps disengage and release the repair liner from its tautly wrapped configuration allowing generally conforming engagement of the repair liner with the inner circumferential surface of the conduit to be repaired; and
allowing said thermosetting resin formulation to cocure and bond said repair liner to the conduit and during said cocuring process, the fusible link segments melt from exothermic reaction of the thermosetting resin formulation so as to disconnect the repair liner from the carrier.

35. The method of claim 34, further including deflating said bladder after the bonding substance has cocured to provide a repaired conduit.

36. The method of claim 35, further including removing said carrier from the conduit after deflating the bladder and disengaging the repair liner from the hook and loop fastener attached to the bladder.

37. The method of claim 36, in which said repair liner is shorter than the length of the bladder surface.

38. A method according to claim 34, wherein said thermosetting resin formulation is a two part thermosetting resin formulation selected from a group consisting of polyester, vinylester, and epoxy resins.

39. A method according to claim 34, wherein the repair liner comprises:
   a first layer of material capable of absorbing a thermosetting resin formulation;
   a second layer of material capable of absorbing said thermosetting resin formulation; and
   a layer of fiber-reinforced material fixed between said first and second layers of material capable of absorbing the thermosetting resin formulation.

40. A method according to claim 39, wherein the layer of fiber-reinforced material is constructed of 0/90 fiber-reinforced material, said fiber-reinforced material having a nominal weight of about 32 oz./yd$^2$.

41. A method according to claim 39, wherein the first layer of material capable of absorbing said thermosetting resin formulation is constructed from materials selected from a group consisting of polyester, felt, foam and combinations thereof; and
   wherein the second layer of material capable of absorbing said thermosetting resin formulation is constructed from materials selected from a group consisting of polyester, felt, foam and combinations thereof.

42. A method of repairing ruptures in a generally cylindrical underground conduit, comprising the steps of:
   attaching a hook and loop fastener means to a bladder surface of a carrier, said hook and loop fastener extending longitudinally along the bladder surface and being of sufficient length to engage a mating hook and loop fastener attached to a repair liner;
   applying a water base releasing agent completely covering the bladder surface including the hook and loop fastener attached to the bladder surface;
   applying a thermosetting resin formulation to a repair liner;
   placing the carrier on the repair liner and engaging the hook and loop fastener attached to the bladder surface and its mating hook and loop fastener attached to the repair liner at an intermediate position and extending between a leading edge and a trailing edge of the repair liner;
   wrapping the repair liner around the bladder surface of the carrier and engaging a first end of the repair liner with a second end of the repair liner with a hook and loop fastener;
   tautly wrapping and circumferentially securing said tautly wrapped repair liner with a plurality of hook and loop fastener straps;
   introducing said carrier and repair liner combination into a cylindrical conduit, proximate said rupture to be repaired;
   inflating said bladder so that the plurality of hook and loop fastener straps disengage and release the repair liner from its tautly wrapped configuration allowing generally conforming engagement of the repair liner with the inner circumferential surface of the conduit to be repaired; and
   allowing said thermosetting resin formulation to cocure and bond said repair liner to the conduit.

43. The method of claim 42, further including deflating said bladder after the bonding substance has cocured to provide a repaired conduit.

44. The method of claim 43, further including removing said carrier from the conduit after deflating the bladder and disengaging the repair liner from the hook and loop fastener attached to the bladder.

45. The method of claim 44, in which said repair liner is shorter than the length of the bladder surface.

46. A method according to claim 42, wherein said thermosetting resin formulation is a two part thermosetting resin formulation selected from a group consisting of polyester, vinylester, and epoxy resins.

47. A method according to claim 42, wherein the repair liner comprises:
   a first layer of material capable of absorbing a thermosetting resin formulation;
   a second layer of material capable of absorbing said thermosetting resin formulation; and
   a layer of fiber-reinforced material fixed between said first and second layers of material capable of absorbing the thermosetting resin formulation.

48. A method according to claim 47, wherein the layer of fiber-reinforced material is constructed of 0/90 fiber-reinforced material, said fiber-reinforced material having a nominal weight of about 32 oz./yd$^2$.

49. A method according to claim 47, wherein the first layer of material capable of absorbing said thermosetting resin formulation is constructed from materials selected from a group consisting of polyester, felt, foam and combinations thereof; and wherein the second layer of material capable of absorbing said thermosetting resin formulation is constructed from materials selected from a group consisting of polyester, felt, foam and combinations thereof.

* * * * *

UNITED STATES PATENT AND TRADEMARK OFFICE
CERTIFICATE OF CORRECTION

PATENT NO : 6,019,136
DATED : February 1, 2000
INVENTOR(S) : John Walsh and Scott Hedeen It is certified that error appears in the above-identified patent and that said Letters Patent is hereby corrected as shown below:

Col. 11, line 47
  replace "claim further"
  with --claim 25, further--.

Signed and Sealed this

Seventh Day of November, 2000

Attest:

Q. TODD DICKINSON

*Attesting Officer*  *Director of Patents and Trademarks*